United States Patent [19]

Ito et al.

[11] Patent Number: 5,151,793
[45] Date of Patent: Sep. 29, 1992

[54] RECORDING MEDIUM PLAYING APPARATUS

[75] Inventors: Hiroshi Ito, Saitama; Seigo Ando, Tokyo; Bonpei Inaba, Saitama, all of Japan

[73] Assignee: Pioneer Electronic Corporation, Tokyo, Japan

[21] Appl. No.: 574,873

[22] Filed: Aug. 30, 1990

[30] Foreign Application Priority Data

Feb. 26, 1990 [JP] Japan .................................. 2-45048

[51] Int. Cl.⁵ .............................................. H04N 5/76
[52] U.S. Cl. .................................... 358/335; 358/310; 360/33.1
[58] Field of Search ................. 358/335, 342, 183, 22, 358/310, 330, 311, 320, 323; 360/33.1, 35.1

[56] References Cited

U.S. PATENT DOCUMENTS

| | | | |
|---|---|---|---|
| 4,688,105 | 8/1987 | Bloch et al. | 358/342 |
| 4,816,929 | 3/1989 | Bradley et al. | 360/10.1 |
| 5,016,113 | 5/1991 | Yamashita et al. | 358/335 |
| 5,099,337 | 3/1992 | Cury | 358/335 |

Primary Examiner—Tommy P. Chin
Assistant Examiner—Huy Nguyen
Attorney, Agent, or Firm—Sughrue, Mion, Zinn, Macpeak & Seas

[57] ABSTRACT

Karaoke is provided more easily and flexibly by recording video signals from multiple video sources on a disk; selecting one of those sources as desired; and reproducing the signals from that source along with either the output of a video camera or graphics data. The graphics data is recorded on the disk with the video source signals in multiplexed fashion, along with selection signals. When the multiplexed signals are demultiplexed, chroma-key composite circuitry effects desired superimposition of a video camera output on the source video signals.

5 Claims, 5 Drawing Sheets

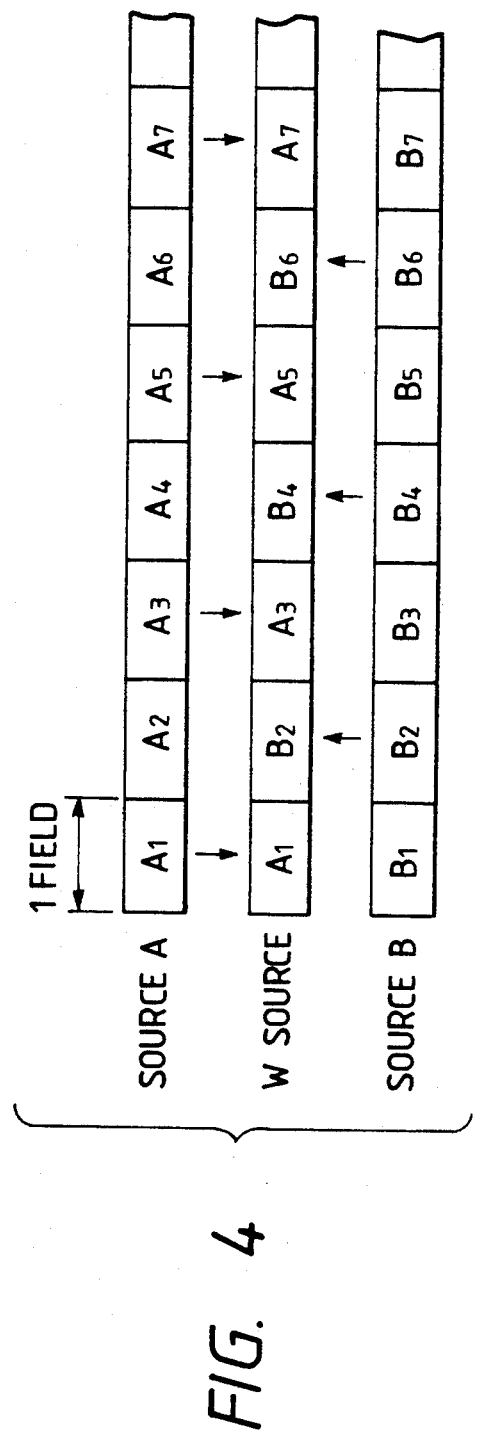
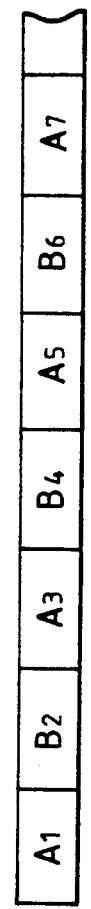
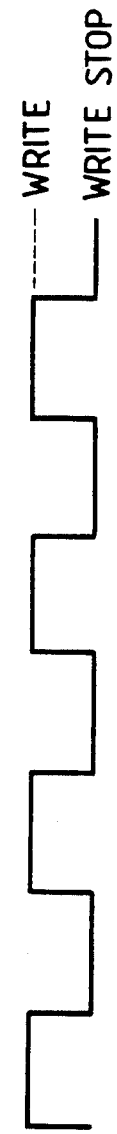
FIG. 4
FIG. 6A
FIG. 6B

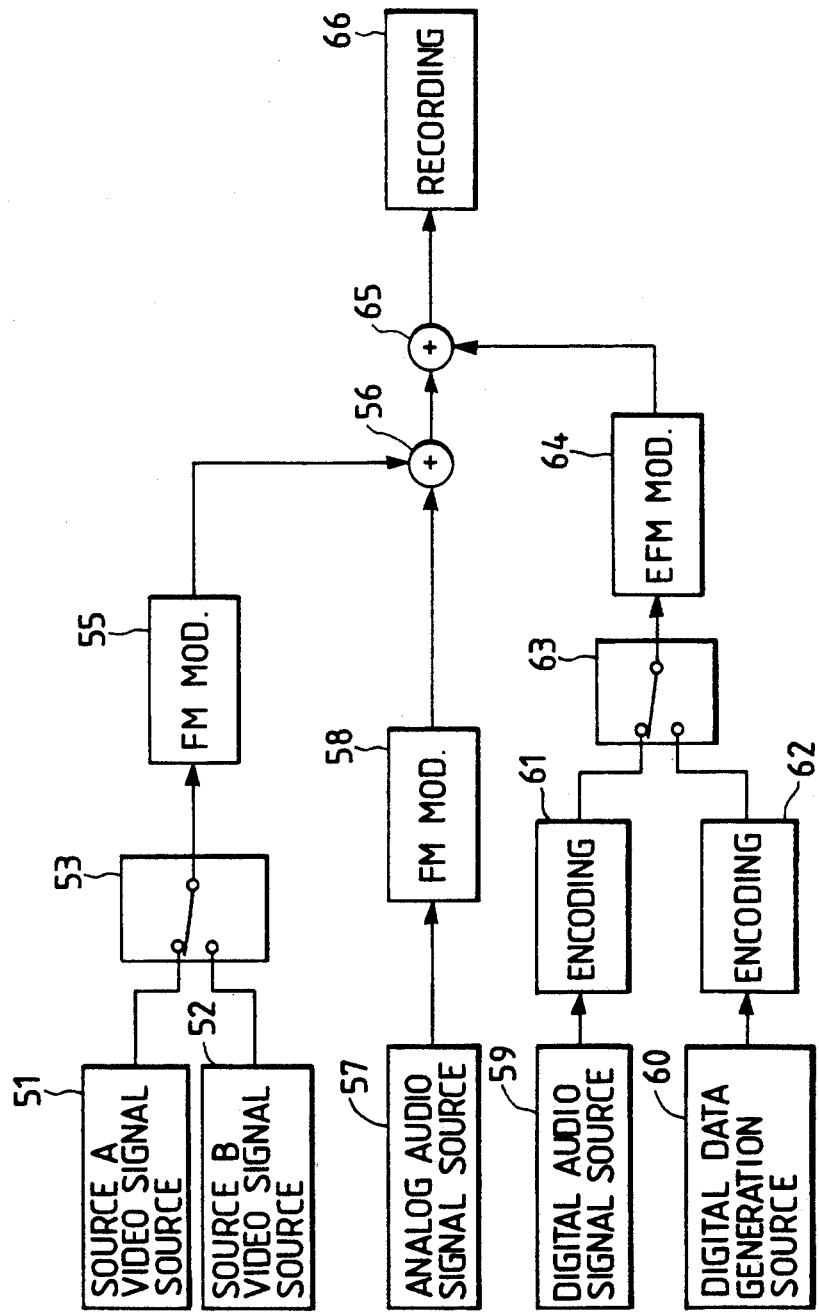

RECORDING MEDIUM PLAYING APPARATUS

BACKGROUND OF THE INVENTION

The present invention relates to a recording medium playing apparatus for a video disk player or the like.

Recording medium playing apparatuses with a function for making a chroma-key composite of a video signal, input from a video camera, with a video signal extracted by playing a recording medium have been disclosed, for example, in Japanese Patent Laid Open Publication No. Hei. 1-318385. In such an apparatus, any object taken by a user can be formed into a composite picture obtained by playing the recording medium. However, if character information, such as a picture description or a song text, is included in the picture obtained by playing the recording medium, part or all of the character information is erased by the chroma-key composite picture.

SUMMARY OF THE INVENTION

In view of the foregoing, an object of the present invention is to provide a recording medium playing apparatus for preventing character information in a chroma-key composite picture, obtained by playing a recording medium, from being erased.

The present invention is a recording medium playing apparatus for playing a recording medium which records a multiplexing signal, the multiplexing signal being multiplexed by a first modulation carrier signal for carrying a composite video signal and a second modulation carrier signal for carrying a digital graphics signal. The recording medium playing apparatus includes extracting and demodulating circuitry for extracting and demodulating the composite video signal and the graphics signal from the multiplexing signal being read from the recording medium, chroma-key composing circuitry for making a chroma-key composite of a video signal, input from a video camera, onto the composite video signal being output from the extracting and demodulating circuitry, and graphics composing circuitry for making a composite of the graphics signal being output from the extracting and demodulating circuitry onto the video signal being output from the chroma-key composing circuitry.

In the inventive recording medium playing apparatus, a graphics signal, once extracted and demodulated, is composed into a video signal into which a chroma-key composite is made. Thus, when character information such as a song text is included in a graphics signal, a chroma-key composite picture can be obtained without missing the character information.

BRIEF DESCRIPTION OF THE DRAWINGS

FIG. 4 is a schematic showing a picture recording state of a W source disk;

FIGS. 6A and 6B show write timing to a picture memory in the apparatus shown in FIG. 1; and FIG. 7 is a block diagram showing a structure of a recording apparatus for the W source disk.

DETAILED DESCRIPTION OF THE PREFERRED EMBODIMENT

A preferred embodiment of the present invention now will be described in detail with reference to the accompanying drawings.

Figure 1:
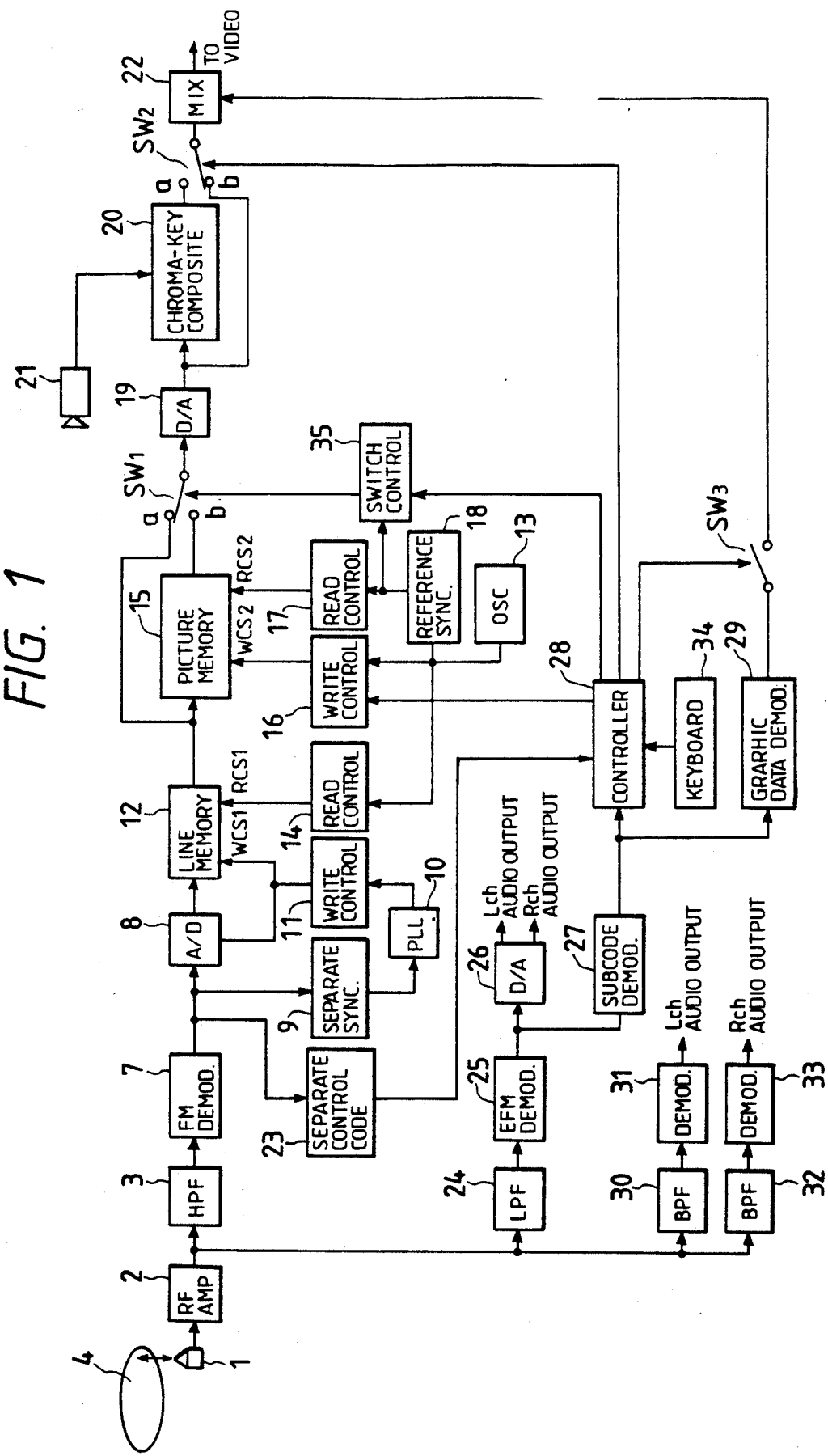
FIG. 1 is a block diagram showing an embodiment of the present invention.

In FIG. 1, a video disk 4 is rotatably driven by a motor (not shown) and a servo loop (not shown). Information recorded on the disk 4 is read by an optical pick-up 1. The pick-up 1 is provided with a laser diode, an actuator for focusing a light beam irradiated from the laser diode on a recording surface of the disk, an actuator for controlling the radial position of the focused point of the light beam, etc. There also is a servo loop for controlling the driving of the various actuators of the pick-up 1. However, since the description of the servo loop is not necessary for an understanding of the present invention, such description is omitted in the figure.

With a key operation of a keyboard 34, which will be described later, the operation of the pick-up 1 is started and stopped by a controller 28. A read RF signal read by the pick-up 1 is sent to an HPF 3 (high pass filter) through an RF amplifier 2. The HPF 3 only passes the frequency band for the video signal component of the read RF signal. The read RF signal which is passed through the HPF 3 is sent to an FM demodulation circuit 7 to FM-demodulate the signal.

A composite video signal (hereinafter called the video signal) which is demodulated by and output from the FM demodulation circuit 7 is sent to an analog-to-digital (A/D) converter 8 and a synchronizing separation circuit 9. For example, the synchronizing separation circuit 9 separates and extracts a horizontal synchronizing signal from the video signal. The horizontal synchronizing signal is sent to a phase-locked loop (PLL) circuit 10. The PLL circuit 10 generates a clock whose phase synchronizes with the video signal according to the horizontal synchronizing signal.

The clock generated by the PLL circuit 10 is sent to a write control circuit 11, wherein the clock is used as a conversion clock for the A/D converter 8 and a write clock for a line memory 12 at the next stage. The digital video signal written in the line memory 12 is read with a read control signal from a read control circuit 14 in accordance with a master clock of a clock oscillator 13. Subsequently, the signal is written to a particular address of a picture memory 15 by means of a write control signal from write control circuit 16. A read control signal RCS1 for the line memory 12 and a write control signal WCS2 and a read control signal RCS2 for the picture memory 15 are generated with the master clock by the clock oscillator 13, the time axis of the master clock being stable. By writing the video signal to the line memory 12 in accordance with the clock whose phase synchronizes with the video signal, and by reading the video signal according to the master clock which has a stable time axis, it is possible to compensate for time axis fluctuation, i.e. jitter, in the video signal. This process is referred to as a time axis compensation process.

The picture memory 15 has a capacity to store one field of the video signal. Whenever the video signal is read from the line memory 12, it is written sequentially at a particular address of the picture memory 15. The video signal is controlled with the write control signal WCS2 and the read control signal RCS2 which are sent respectively from the write control circuit 16 and the read control circuit 17, so that the reading and the writing of the video signal can be conducted independently. In this case, the read control signal RCS2 is a signal whose phase synchronizes with a reference synchronizing signal generated by a reference synchronizing signal generator 18. Thus, while the synchronizing signal is discontinuous, even if the video signal is written to the picture memory 15 because of a track jumping operation in a special reproduction state, by reading the video signal by means of the read control signal RCS2 whose phase synchronizes with the reference synchronizing signal, the video signal can be synchronized with the horizontal and vertical synchronizing signals, and thus the synchronizing conversion process can take place.

A digital video signal read from the picture memory 15 is sent to a digital-to-analog (D/A) converter 19 through a selection switch SW1. The selection switch SW1 has two fixed contacts a and b, one of those contacts being always selected. The fixed contact a is connected to the read terminal of the line memory 12, while the fixed contact b is connected to the read terminal of the picture memory 15. The output of the D/A converter 19 is connected to a chroma-key composing circuit 20, which makes a composite by superimposing a picture of the range except for a particular color (for example, blue) of a second picture (taken by a video camera 21) onto a first picture (by means of a video signal being output from the D/A converter 19). The structure of the chroma-key composing circuit 20 will be described later.

The video signal which is output from the chroma-key composing circuit 20 is sent to an MIX circuit 22 through a selection switch SW2. The selection switch SW2 has two fixed contacts a and b, one of them being always selected. The fixed contact a is connected to the output of the chroma-key composing circuit 20, while the fixed contact b is connected to the output of the D/A converter 19. In the normal state, the selection switch SW2 is placed on the fixed contact b side. The MIX circuit 22 mixes a graphics signal, which is output from the graphics data demodulation circuit, with the video signal selectively sent from the selection switch SW2.

The output of the FM demodulation circuit 7 is connected to a control code separation circuit 23, which extracts a user code which is recorded in a particular horizontal scanning pulse in the video signal, and sends it to the controller 28. The user code distinguishes between a normal disk, where a normal video signal is recorded, each frame of which consists of two continuous fields, and a special source disk (hereinafter called a W source disk), whose fields alternately record two different source signals. Details of the W source disk will be described later. The controller 28, which is composed of a microcomputer, stops the write control operation of the write control circuit 16 in accordance with the user code.

The output of the RF amplifier 2 is connected to an LPF 24 (low pass filter) and BPFs (band pass filters) 30 and 32. The LPF 24 only passes the frequency band for the digital signal component of the read RF signal. The read RF signal which is passed through the LPF 24 is sent to an eight to fourteen (EFM) demodulation circuit 25, which performs an EFM demodulation process for a pulse signal where the RF signal has been sliced and outputs pulse code modulated (PCM) data, namely, timesharingly multiplexed digital data including audio information and sub code on the left and the right channels.

The digital data which is output from the EFM demodulation circuit 25 is sent to a D/A converter 26 so as to generate left and right analog audio signals. The digital data is sent to a sub code demodulation circuit 27, which demodulates the digital signal to the sub code signal, which then is sent to the controller 28 and to a graphic data demodulation circuit 29. The controller 28, which is composed of a microcomputer, independently controls the switches SW1, SW2, and SW3 in accordance with the sub code signal.

A switch control circuit 35, consisting of a logical circuit, is provided between the switch SW1 and the controller 28. The reference synchronizing signal, which is generated by the reference synchronizing signal generator 18, is sent to the switch control circuit 35. When the sub code signal is graphics data, the graphic data demodulation circuit 29 generates the graphics signal in accordance with the sub code signal. The graphics signal is sent to the MIX circuit 22 through the switch SW3.

The BPFs 30 and 32 have different frequency characteristics. They only pass the frequency band of the analog audio signal component on the left and the right channels of the read RF signal, respectively. The BPF 30 outputs the analog audio signal component on the left channel. The demodulation circuit 33 demodulates the output component. On the other hand, the BPF 30 outputs the analog audio signal component on the right channel. The demodulation circuit 33 demodulates the output component.

Figure 2:
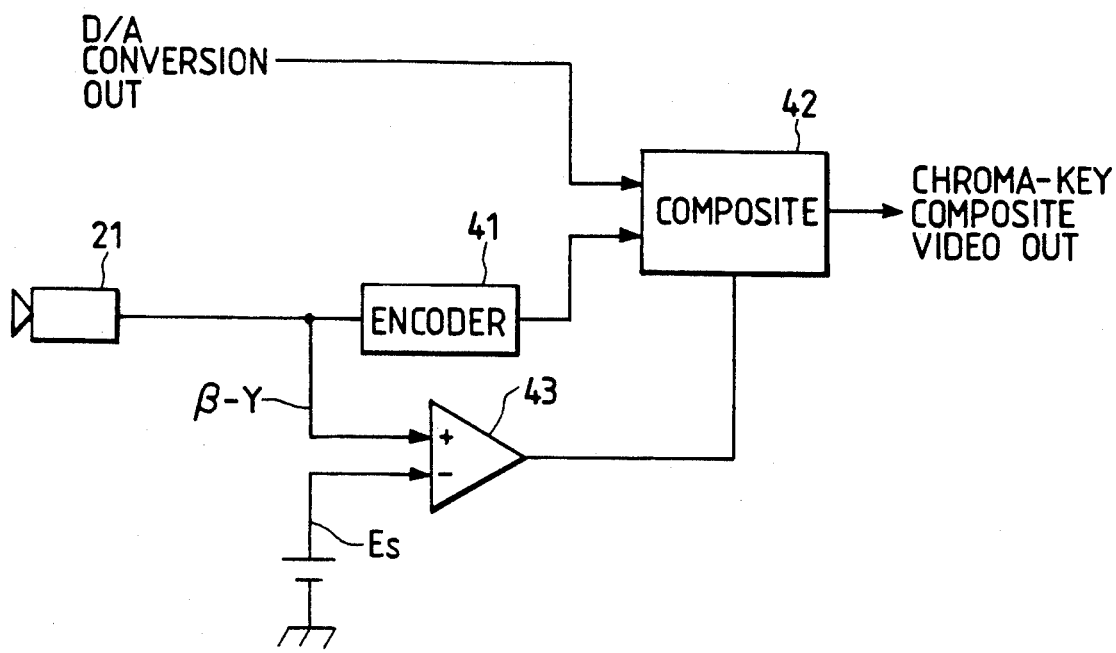
FIG. 2 is a circuit diagram showing a practical structure of a chroma-key composite circuit of the apparatus shown in FIG. 1.

FIG. 2 shows a practical structure of the chroma-key composing circuit 20. In this circuit, a component video signal output from the video camera 21 is converted into a composite video signal by an encoder 41. The composite video signal is sent to a composite circuit 42. The component video signal consists of a luminance signal Y, color difference signals R-Y and B-Y, and a synchronizing signal. The color difference signal B-Y of the component video signal is sent to a comparator 43 so as to compare it with a reference voltage Es. When B - Y is equal to or greater than Es, the output level of the comparator 43 becomes high. When B - Y is less than Es, the output level of the comparator 43 becomes low. The output signal of the comparator 43 is sent to the composite circuit 42.

Figure 3A:
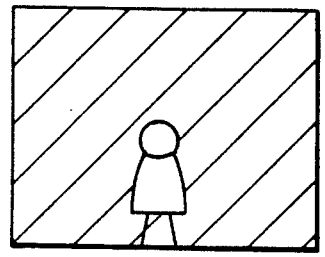
FIGS. 3A-3C are schematics showing a chroma-key composite operation.
Figure 3B:
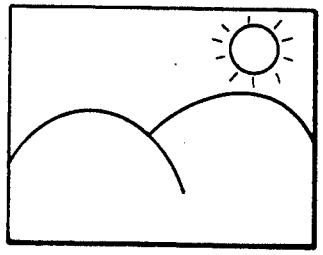
Figure 3C:
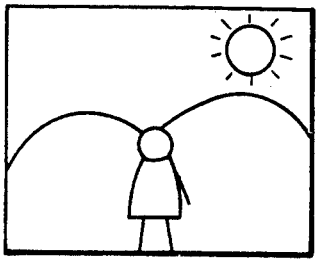

When the output level of the comparator 43 is high, the composite circuit 42 outputs a video signal from the D/A converter 19. On the other hand, when the output level of the comparator 43 is low, the composite circuit 42 outputs a video signal from the encoder 41. Thus, when the background color of the object of the video camera 21 is blue, the output levels of the comparator 43 at the object and at the background become low and high, respectively. Thus, when the picture being output from the video camera 21 is as shown in FIG. 3A and that from the D/A converter 19 is as shown in FIG. 3B, in the picture by means of the video signal being output from the composite circuit 42, the background of the object is obtained by means of the video signal being output from the D/A converter 19 as shown in FIG. 3C.

On the other hand, on the aforementioned W source disk, as shown in FIG. 4, when the fields of one signal source A are continuous, i.e. A1, A2, A3, A4, etc., and those of the other signal source are continuous, i.e. B1, B2, B3, B4, etc., the signal sources are alternately changed for the fields in such manner that the first field is the field A1; the second field is the field B2; the third field is the field A3; the fourth field is the field B4; and so on. On the other hand, the audio signal is common in the signal sources A and B. On the W source disk, where the video signal is recorded in the aforementioned manner, a user code is recorded at a particular horizontal scanning pulse so as to distinguish between the W source disk and the conventional video disk. By detecting this user code, the W source disk is distinguished.

On the other hand, when the W source disk is used as a so-called Karaoke (music playing without song), the picture from the signal source A includes song text information, while the picture from the signal source B does not include song text information. In this case, the graphic data on the R to W channels of the sub code includes song text information. The remaining data area of the sub code records the control information of the switches SW1, SW2, and SW3.

Figure 5:
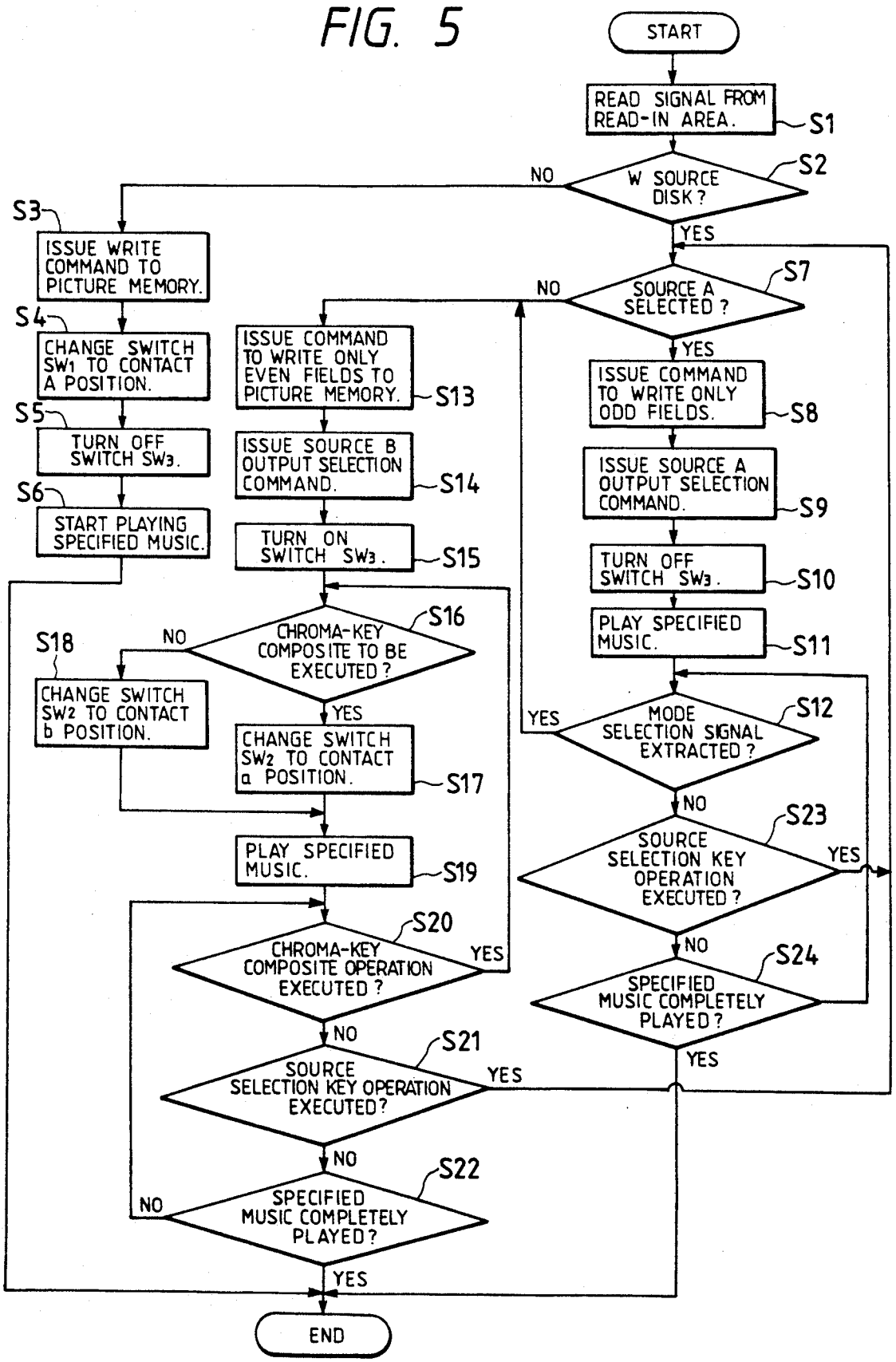
FIG. 5 is a flow chart showing the operation of a controller of the apparatus shown in FIG. 1.

The operation of the controller 28 for playing such a video disk will be described in the following. When the start of playing is commanded by means of a key operation of the keyboard 34 as shown in FIG. 5, the controller 28 starts reading a signal from the read-in area of the disk (step S1). The controller 28 determines, by means of the user code, whether the playing disk is the W source disk, which is output from the control code separation circuit 23 (step S2). When the playing disk is not the W source disk, the controller 28 determines that the disk is a conventional video disk, issues a write command to the write control circuit 16 so as to write data to the picture memory 15 (step S3), and changes the switches SW1 and SW2 to the fixed contacts a and b positions, respectively (step S4). On the other hand, the controller 28 turns off the switch SW3 (step S5) and plays music specified by the keyboard 34 (step S6).

Thus, whenever the video signal whose time axis has been compensated is read from the line memory 12, that video signal is written sequentially to a particular address of the picture memory 15. The video signal being read from the line memory 12 is converted into an analog signal by the D/A converter 19 through the switch SW1. After that, the analog signal is sent to the MIX circuit 22 through the switch SW2. Thus, the video signal recorded on the disk is output in the through state. On the other hand, in a particular operation such as scan, random, or access, since the synchronizing signal becomes discontinuous, the controller 28 changes the switch SW1 to the fixed contact b position and uses the video signal where the synchronous conversion process has been conducted.

Contrary, in the case of the W source disk, the controller 28 determines whether the signal source A has been selected (step S7). In other words, the controller 28 determines which of signal sources A or B recorded on the disk is played. One of the signal sources A and B is commanded selectively in accordance with the operation of the source selection key (not shown) on the keyboard 34. Since the data which represents the source being commanded is stored in a register (not shown) on the controller 28, the signal source being used is determined by the register content. The register content does not change depending on a mode selection signal (described later) which is extracted from the sub code signal.

When the signal source A is selected, the controller 28 commands the write control circuit 16 to write data to only the odd fields (step S8). Thus, as shown in FIG. 6A, when the fields are continuous, i.e. A1, B2, A3, B4, A5, B6, etc., the write control circuit 16 executes the write operation only for the odd fields A1, A3, A5, etc. Consequently, only the video signal of the signal source A is written to the picture memory 15. In addition, the controller 28 issues a source A output selection command to the switch control circuit 35 (step S9). Moreover, the controller 28 turns off the switch SW3 (step S10) and plays the specified music (step S11). The switch control circuit 35 changes the position of the switch SW1 at each field in accordance with the reference synchronizing signal from the reference synchronizing signal generator 18 depending on the source A output selection command. At that time, the video signal is output from the switch SW1 in such manner that the first field is the field A1 from the line memory 12; the second field is the field A1 from the picture memory 15; the third field is the field A3 from the line memory 12; the fourth field is the field A3 from the picture memory 15; and so on. After this video signal is converted into an analog signal by the D/A converter 19, the resultant analog signal is sent to the MIX circuit 22 through the switch SW2. When the switch SW3 is turned off, the video signal from source A is output directly, rather than being sent to the MIX circuit 22.

While the disk from which the video signal of the source A is output is being played, the controller 28 determines whether the mode selection signal is extracted from the sub code signal (step S12). When the mode selection signal is detected, the controller 28 advances the flow to step S13, as in the case that it determines that the signal source B is selected in step S7.

In step S13, the controller 28 commands the write control circuit 16 to write data only to the even fields. After that, the controller 28 issues the source B output selection command to the switch control circuit 35 (step S14) and turns on the switch SW3 (step S15). The controller 28 executes step S15 and then determines whether it executes the chroma-key composite (step S16). In other words, the controller 28 determines whether the chroma-key composite stop command occurs by the operation of a chroma-key composite key (not shown) on the keyboard 34. When the chroma-key composite stop command is not issued, the controller 28 changes the switch SW2 to the fixed contact a position (step S17). When the controller 28 determines that the chroma-key composite is not commanded, it changes the switch SW2 to the fixed contact b position (step S18). After the controller 28 executes steps S17 and S18, it plays the specified song (step S19).

When the controller 28 selects the source B, the write control circuit 16 writes data only when the video signal being read from the line memory 12 is the even fields B2, B4, B6, etc. Consequently, only the video signal from the signal source B is written to the picture memory 15. At that time, the video signal is output from the switch SW1 in such manner that the first field is the field B2 from the line memory 12; the second field is the field B2 from the picture memory 15; the third field is the field B4 from the line memory 12; the fourth field is the field B4 from the picture memory 15; and so on. After this video signal is converted into an analog signal by the D/A converter 19, the resultant analog signal is sent to the MIX circuit 22 through the switch SW2. When the switch SW3 is turned on, a graphics signal, which is song text information, is sent to the MIX circuit 22. The MIX circuit 22 makes a composite of the graphics signal with the video signal so that the song text information is allocated at a particular position of the picture of the video signal, and then outputs the composite video signal.

When the chroma-key composite is executed, the chroma-key composite video signal from the chroma-key composing circuit 20, that is, the signal where a video signal of the object being output from the video camera 21 is composed with a video signal being output from the D/A converter 19, is sent to the MIX circuit 22 through the switch SW2. In the MIX circuit 22, the chroma-key composite video signal is composed with the graphics signal.

After the controller 28 executes step S19, it determines whether the chroma-key composite key on the keyboard 34 has been operated (step S20). When the chroma-key composite key has been operated, the controller 28 advances to step S16. When the chroma-key composite key has not been operated, the controller 28 determines whether the source selection key on the keyboard 34 has been operated (step S21). When the source selection key has been operated, the controller 28 returns the flow to step S7. When the source selection key has not been operated, the controller 28 determines whether all of the specified music has been played (step S22). When all of the specified music has been played, the controller 28 completes the routine. When the specified music is being played, the controller 28 advances the flow to step S20.

When the mode selection signal is not detected in step S12, the controller 28 determines whether the source selection key on the keyboard 34 has been operated (step S23). When the source selection key has been operated, the controller 28 advances the flow to step S7. When the source selection key has not been operated, the controller 28 determines whether all of the specified music has been played (step S24). When the specified music has been played completely, the controller 28 completes this routine. When the specified music is being played, the controller 28 advances the flow to step S12. When the subsequent song is played, the controller 28 returns the flow to step S1 and executes it.

Consequently, while a video signal from the source A is being output, if the mode selection signal is detected, a video signal with which a graphics signal is combined to make a composite is output from the source B. In the state where the chroma-key composite is executed, a chroma-key composite video signal is output. As the picture of such an output video signal, the object being taken by the video camera 21 is superimposed onto a picture from the source B. In addition, a song text is added the superimposed picture to make a further composite. Thus, it is possible to include a picture of a singer in a picture from the source A when the climax of the song starts. In addition, since the content of the register of the controller 28 does not change depending on the mode selection signal, when the picture from the source A is automatically changed to that from the source B in accordance with the mode selection signal, unless the source selection key is operated, the picture from the source A continuously takes place in the subsequent music playing.

Moreover, while a picture from the source A is displayed, it is possible to superimpose an object being taken by the video camera 21 onto a picture from the source A with the operation of the chroma-key composite key. However, in this case, the song text portion is lost by the chroma-key composite operation.

In FIG. 7, Which shows the structure of a recording apparatus for the W source disk, video signal sources 51 and 52, such as video cassette recorders or the like, output video signals of the sources A and B. Video signal sources 51 and 52 send video signals of these sources in synchronization with a synchronizing signal being output from a synchronizing signal generator or the like (not shown). The video signals of the sources A and B which are output from the video signal sources 51 and 52 are sent to a video multiplexing circuit 53, which generates the selection command signal at intervals of one field by the synchronizing signal being output, for example, from a synchronizing signal generator (not shown). With the selection command signal, the video signal from either source A or source B is output selectively. Thus, the video multiplexing circuit 53 extracts the video signal alternately from sources A and B at intervals of one field.

The signal being output from the video multiplexing circuit 53 is sent to an FM modulator 55. The FM modulator 55 modulates a first particular frequency of a carrier signal so as to generate a video FM signal as the first modulation carrier signal. The video FM signal is sent to an addition circuit 56.

Moreover, a sound signal source 57 such as an audio tape recorder outputs an analog sound signal. The sound signal which is output from the sound signal source 57 is sent to an FM modulator 58. The FM modulator 58 modulates a carrier signal at a second particular frequency so as to generate a sound FM signal. This sound FM signal is sent to the addition circuit 56 and then is added to the picture FM signal.

On the other hand, a sound signal source 59 generates a digital sound signal. A digital data generation source 60, such as a microcomputer or the like, outputs digital data signals such as a graphics signal and mode selection signals other than the digital sound signal. The digital sound signal and the digital data signal are encoded in the CD format by encoding circuits 61 and 62, respectively. Output data of the encoding circuits 61 and 62 are sent to a multiplexing circuit 63. The multiplexing circuit 63 outputs data from one of the encoding circuits 61 and 62 in accordance with the reference timing signal, which is output from a timing signal generator or the like (not shown). The resultant signal from the multiplexing circuit 63 is sent to an EFM modulator 64 and then is converted into an EFM signal as a second modulation carrier signal. The output of the EFM modulator 64 is sent to an addition circuit 65 and then is added to the output signal from the addition circuit 56. The output of the addition circuit 65 is sent to a recording apparatus 66, such as, for example, a known optical video disk recorder. In the recording apparatus 66, the signal from the addition circuit 65 is sent to an optical modulator so as to form recording tracks on the recording surface of the disk, which rotates at a frame period (1/30 sec.), each recording track being composed of pits.

The aforementioned embodiment has been described with a video disk as the recording medium. However, it will be readily apparent to those skilled in the art that various modifications may be made and other embodiments for other VCRs implemented without departing from the scope of the inventive concept.

As was described above, the recording medium playing apparatus according to the present invention extracts and demodulates a composite video signal and graphics signal from a multiplexed signal being read from a recording medium, chroma-key composes a video signal being output from a video camera into the composite video signal, and composes the extracted and demodulated signal with the composite signal. Thus, when character information such as song text or the like is included in the graphics signal, even if an object taken by the video camera is chroma-key composed with a picture being obtained by playing a recording medium, a chroma-key composite picture can be obtained without losing character information. In particular, while the present recording medium playing apparatus is used for playing music without song, namely, Karaoke, when the singer is taken by the video camera, he or she can be included by means of the chroma-key composite in the picture which is obtained by playing the disk. Thus, it is possible to prevent the picture from becoming monotonous and thereby to improve the singing mood.

While the invention has been described in detail above with reference to a preferred embodiment, various modifications within the scope and spirit of the invention will be apparent to people of working skill in this technological field. Thus, the invention should be considered as limited only by the scope of the appended claims.

What is claimed is:

1. A recording medium playing apparatus for playing at least a multiplexing signal from a recording medium on which said multiplexing signal is recorded, said multiplexing signal including a modulation carrier signal for carrying a composite video signal and a digital modulation signal for carrying a digital graphics signal, said apparatus comprising:

first extracting means for extracting said modulation carrier signal from said multiplexing signal;

second extracting means for extracting said digital modulation signal from said multiplexing signal;

first demodulating means for demodulating said composite video signal from said modulation carrier signal extracted by said first extracting means;

second demodulating means for demodulating said digital graphics signal included on said digital modulation signal extracted by said second extracting means;

chroma-key composing means for combining a video signal input from a video camera with said composite video signal from said first demodulating means to output a chroma-key composite signal; and graphics composing means for superimposing said digital graphics signal from said second demodulating means on said chroma-key composite signal.

2. The apparatus as set forth in claim 1, wherein the multiplexing signal includes video signals from a plurality of video sources, and wherein said apparatus further comprises video signal generating means for synchronizing video signals from selected video sources and providing said video signals in alternating fields to generate said composite video signal; and means for selecting either odd-numbered field or even-numbered field from said composite video signal depending on the video source desired, and replacing the unselected fields with said selected fields.

3. The apparatus as set forth in claim 2, further comprising selection command generating means for generating a selection command according to a source selection signal, the source selection signal being either separated and extracted from said multiplexing signal, or produced according to a source selection keying operation, wherein said video signal generating means selects said fields to be replaced in accordance with said selection command.

4. The apparatus as set forth in claim 3, wherein said chroma-key composing means makes said chroma-key composite signal according to said selection command.

5. The apparatus as set forth in claim 2, further comprising selection command generating means for generating a selection command according to a source selection signal, the source selection signal being either separated and extracted from said multiplexing signal, or produced according to a source selection keying operation, wherein said chroma-key composing means produces said chroma-key composite signal according to said selection command.

* * * * *